(12) United States Patent
Boyle

(10) Patent No.: US 9,054,774 B2
(45) Date of Patent: Jun. 9, 2015

(54) COMMUNICATION SYSTEM AND METHOD FOR TRANSMITTING AND RECEIVING SIGNALS

(75) Inventor: Kevin R. Boyle, Horsham (GB)

(73) Assignee: Qualcomm Technologies, Inc., San Diego, CA (US)

(*) Notice: Subject to any disclaimer, the term of this patent is extended or adjusted under 35 U.S.C. 154(b) by 714 days.

(21) Appl. No.: 13/254,398

(22) PCT Filed: Mar. 1, 2010

(86) PCT No.: PCT/EP2010/052560
§ 371 (c)(1),
(2), (4) Date: Nov. 17, 2011

(87) PCT Pub. No.: WO2010/105899
PCT Pub. Date: Sep. 23, 2010

(65) Prior Publication Data
US 2012/0063368 A1    Mar. 15, 2012

(30) Foreign Application Priority Data
Mar. 3, 2009  (EP) .................................. 09154231

(51) Int. Cl.
*H04B 1/56* (2006.01)
*H04B 7/00* (2006.01)
(Continued)

(52) U.S. Cl.
CPC ... *H04B 1/18* (2013.01); *H04B 1/52* (2013.01)

(58) Field of Classification Search
CPC ......... H03H 9/56; H03H 11/00; H03H 21/00; H04L 5/14; H01Q 5/01; H01Q 3/30
See application file for complete search history.

(56) References Cited

U.S. PATENT DOCUMENTS

| 4,730,195 A | 3/1988 | Phillips et al. |
| 5,841,407 A | 11/1998 | Birnbaum |

(Continued)

FOREIGN PATENT DOCUMENTS

| EP | 1 601 112 A1 | 11/2005 |
| EP | 1 909 390 A2 | 4/2008 |

(Continued)

OTHER PUBLICATIONS

European Search Report—EP09154231—Search Authority—Munich—Aug. 9, 2011.

(Continued)

*Primary Examiner* — Brandon Renner
*Assistant Examiner* — Kodzovi Acolatse
(74) *Attorney, Agent, or Firm* — Smith Risley Tempel Santos LLC

(57) ABSTRACT

A communication system transmits signals having frequencies that lie within a transmission band and receives signals having frequencies that lie within a reception band. The system includes a duplexer and an antenna. The duplexer includes a transmission branch and a reception branch. The transmission branch includes a transmission filter, a transmission phase shifting network and a transmission matching network. The reception branch includes a reception filter, a reception phase shifting network and a reception matching network. The transmission matching network and the reception matching network have predominately constant phase shifts over frequencies within the reception band and within the transmission band, respectively. The antenna is coupled to the transmission matching network and to the reception matching network, and shows a predominantly reactance-only impedance variation over frequencies in the transmission band and over frequencies in the reception band.

9 Claims, 1 Drawing Sheet

(51) Int. Cl.
*H04L 5/14* (2006.01)
*H04B 1/18* (2006.01)
*H04B 1/52* (2006.01)

(56) References Cited

U.S. PATENT DOCUMENTS

| | | | |
|---|---|---|---|
| 5,859,473 A | | 1/1999 | Ikata et al. |
| 6,163,238 A | * | 12/2000 | Nestlerode ............. 334/56 |
| 6,366,564 B1 | | 4/2002 | Hiraka et al. |
| 6,445,262 B1 | | 9/2002 | Tanaka et al. |
| 2001/0040487 A1 | | 11/2001 | Ikata et al. |
| 2002/0044092 A1 | * | 4/2002 | Kushihi ............... 343/702 |
| 2002/0135438 A1 | | 9/2002 | Miyamoto et al. |
| 2002/0140520 A1 | * | 10/2002 | Hikita et al. ........... 333/133 |
| 2003/0042995 A1 | * | 3/2003 | Ella .................... 333/133 |
| 2006/0192632 A1 | | 8/2006 | Nakai et al. |
| 2007/0135062 A1 | * | 6/2007 | Hwang et al. ........... 455/80 |
| 2009/0051224 A1 | * | 2/2009 | Cook et al. ............ 307/104 |

FOREIGN PATENT DOCUMENTS

| | | |
|---|---|---|
| JP | S63180224 A | 7/1988 |
| JP | H07221529 A | 8/1995 |
| JP | 2002246946 A | 8/2002 |
| JP | 2005123728 A | 5/2005 |
| WO | WO 2005/034376 A1 | 4/2005 |
| WO | WO 2006/114771 A1 | 11/2006 |

OTHER PUBLICATIONS

International Search Report—PCT/EP2010/052560—ISA/EPO—Jun. 8, 2010.
Rothammel, K, "Rothammels Antennenbuch", Frankh-Kosmos Verlag Stuttgart, 1995, S. 138-139, ISBN 3-440-07018-2.

* cited by examiner

COMMUNICATION SYSTEM AND METHOD FOR TRANSMITTING AND RECEIVING SIGNALS

This patent application is a national phase filing under section 371 of PCT/EP2010/052560, filed Mar. 1, 2010, which claims the priority of European patent application 09154231.6, filed Mar. 3, 2009, each of which is incorporated herein by reference in its entirety.

BACKGROUND

The invention concerns a communication system for transmitting signals having frequencies that lie within a transmission band and for receiving signals having frequencies that lie within a reception band. Such communication systems are used, for example, in mobile phones operating in full-duplex mode, where signals are transmitted and received simultaneously in two different frequency bands. These communication systems usually comprise a duplexer having a transmission branch and a reception branch, where both the transmission branch and the reception branch are connected to a common antenna.

The transmission branch and the reception branch need to be isolated from one another so that transmission signals and reception signals do not interfere with one another even though the transmission branch and the reception branch are connected to a common antenna. Signals with frequencies in the transmission band should be passed to the antenna but not to the reception branch. For these signals, the reception branch should be reflective, that is it should have a reflection coefficient close to unity. Similarly, signals having frequencies in the reception band should only be passed from the antenna to the reception branch but not to the transmission branch. The transmission branch should be reflective for signals with frequencies in the reception band.

The transmission branch and the reception branch also need to be impedance matched to the antenna in order to ensure a low insertion loss for the signals transmitted to the antenna and for the signals received by the antenna. However, the impedance of the antenna typically varies considerably over frequency. For UMTS, the transmission band lies between 1920 MHz to 1980 MHz and the reception band lies between 2110 MHz to 2170 MHz. Both the transmission band and the reception band have a bandwidth of 60 MHz and are separated from one another by 130 MHz. The impedance matching of the antenna is thus a compromise over all frequencies that lie in the 250 MHz band that covers both the transmission band and the reception band. As a result, the transmission branch and the reception branch are usually poorly matched to the antenna which reduces the efficiency of the communication system.

SUMMARY OF THE INVENTION

In one aspect, the invention improves the efficiency of the communication system. With higher efficiencies, smaller and cheaper antennas can be used.

A communication system transmits signals having frequencies that lie within a transmission band and receives signals having frequencies that lie within a reception band. The system comprises a duplexer and an antenna. The duplexer comprises a transmission branch and a reception branch. The transmission branch comprises a transmission filter, a transmission phase shifting network and a transmission matching network. The reception branch comprises a reception filter, a reception phase shifting network and a reception matching network. The transmission matching network and the reception matching network have predominantly constant phase shifts over frequencies within the reception band and within the transmission band, respectively. The antenna is coupled to the transmission matching network and to the reception matching network, and shows a predominantly reactance-only impedance variation over frequencies in the transmission band and over frequencies in the reception band.

Since the transmission matching network and the reception matching network have phase shifts which are predominantly constant over frequencies, the design of the transmission phase shifting network and the reception phase shifting network is simplified as only constant phase shifts over frequency due to the matching networks have to be considered. Through this the design of the communication system becomes more modular.

In an embodiment, the transmission matching network and the reception matching network each comprise a series reactance. Reactances have constant phase shifts over frequency, with an inductance and a capacitance having a phase shift of +90° and −90° respectively. Since the phase shifts are constant, they can be considered in a simple manner when designing the transmission phase shifting network and the reception phase shifting network. Further, since they are connected in series, they can be used to impedance match the reactances of the transmission branch and the reception branch independently of one another to the antenna.

In an embodiment, the antenna is a series resonant antenna having a resonance frequency that lies between the transmission band and the reception band. Since the antenna has a resonance frequency that lies between the transmission band and the reception band, a single antenna can be used for operating in both bands. The reactance of the series resonant antenna can be matched by means of the series reactances.

In an embodiment, the transmission matching network is a series inductor, wherein the reactance of the inductor cancels the reactance of the antenna at frequencies in the transmission band, and the reception matching network is a series capacitor, wherein the reactance of the capacitor cancels the reactance of the antenna at frequencies in the reception band. Alternatively, the transmission matching network is a series capacitor, wherein the reactance of the capacitor cancels the reactance of the antenna at frequencies in the transmission band, and the reception matching network is a series inductor, wherein the reactance of the inductor cancels the reactance of the antenna at frequencies in the reception band. The transmission branch and the reception branch can be matched independently of each other to the antenna for frequencies in the transmission band and in the reception band, respectively. Since the impedance matching only has to cover the frequencies in the transmission band or the reception band, a better matching can be achieved than when the impedance matching has to cover the frequencies in the transmission band and in the reception band as well as the frequencies lying between the transmission band and the reception band. A better matching of the transmission branch and the reception branch to the antenna reduces the insertion loss. Since the matching is only required for a much smaller bandwidth, antennas with higher quality factors Q can be used, enabling the use of smaller antennas.

In an embodiment, the transmission phase shifting network and the reception phase shifting network are transmission lines, wherein the transmission lines have phase shifts so that the transmission branch presents an open circuit for frequencies within the reception band, and the reception branch presents an open circuit for frequencies within the transmission band. The phase shifts are chosen such that incoming and reflected signals from the other frequency band cancel each other out within a branch. Each branch acts as an open circuit for the frequencies of the other branch, increasing the isolation between the branches.

In an embodiment, the transmission band and the reception band are separated in frequency from each other by more than twice the bandwidth of the transmission band for the bandwidth of the reception band. The invention is especially effective for increasing the efficiency of communication systems, where the transmission band and the reception band are separated by a larger range of frequencies, since no impedance matching for frequencies between the bands is required.

In an embodiment, the antenna has a quality factor greater than 20. Because of the separate matching of the transmission branch and the reception branch, antennas with higher quality factors Q can be used and matched to the duplexer. A high-quality factor Q allows smaller antennas to be used.

In an embodiment, the transmission filter passes frequencies within the transmission band and blocks frequencies within the reception band, the reception filter passes frequencies within the reception band and blocks frequencies within the transmission band, and at least one of the transmission filter and reception filter comprises a bulk acoustic wave (BAW) filter or a surface acoustic wave (SAW) filter. Both filters are band passes for frequencies in their own band and suppress frequencies from the other band in order to increase the isolation between the transmission branch and the reception branch. Bulk acoustic wave filters have low insertion losses within the pass band and have a high rejection outside the pass band.

The invention further provides a method for transmitting signals having frequencies within a transmission band and for receiving signals having frequencies within a reception band, using a common antenna, wherein the antenna shows a predominantly reactance-only impedance variation over frequencies within the transmission band and within the reception band, and a transmission branch and a reception branch are impedance matched to the antenna using a transmission matching network and a reception matching network, respectively, which have phase shifts that are predominantly constant over frequencies within the reception band and within the transmission band, respectively.

In an embodiment, an inductor is used as the transmission matching network and the inductance is chosen to cancel the reactance of the antenna at frequencies in the transmission band.

In an embodiment, a capacitor is used as the reception matching network and the capacitance is chosen to cancel the reactance of the antenna at frequencies in the reception band.

In an embodiment, a transmission phase shifting network and a reception phase shifting network are provided in the transmission branch and the reception branch, respectively, and are selected such that the transmission branch presents an open circuit for frequencies in the reception band, and the reception branch presents an open circuit for frequencies in the transmission band.

In an embodiment, transmission and reception of signals occur simultaneously using different frequencies.

In an embodiment, Wideband Code Division Multiple Access (WCDMA) is used for transmission and reception of signals.

BRIEF DESCRIPTION OF THE DRAWINGS

Embodiments of the invention will now be described with the aid of figures.

The following list of reference symbols may be used in conjunction with the drawings:
fR frequency in reception band
fT frequency in transmission band
A antenna
C series capacitance
CP common port
D duplexer
L series inductance
R reception branch
R1 incoming reception signal
R2 reflected reception signal
RB reception band
RF reception filter
RM reception matching network
RP reception phase shift network
RX reception port
T transmission branch
T1 incoming transmission signal
T2 reflected transmission signal
TB transmission band
TF transmission filter
TM transmission matching network
TP transmission phase shift network
TX transmission port
X resistance
XO antenna resistance
Y reactance
Y1 antenna reactance in transmission band
Y2 antenna reactance in reception band

DETAILED DESCRIPTION OF ILLUSTRATIVE EMBODIMENTS

Figure 1:
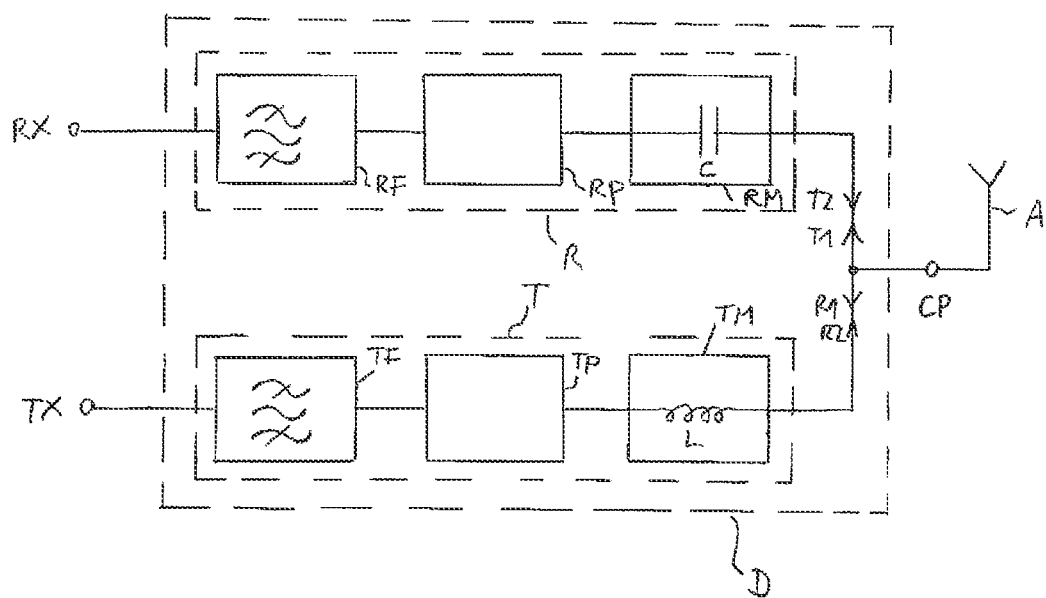
FIG. 1 shows a block diagram of an embodiment of the communication system.

FIG. 1 shows a block diagram of an embodiment of the communication system. The communication system comprises a duplexer D having a reception port RX, a transmission port TX and a common port CP. An antenna A is coupled to the common port CP. The duplexer D allows full-duplex operation: signals having frequencies in a transmission band TB can be applied to the transmission port TX and transmitted by the antenna A while at the same time signals having frequencies in a reception band RB can be received by the antenna A and can be tapped off at the reception port RX. The same antenna A is used for simultaneously receiving and transmitting signals at different frequencies.

The duplexer D comprises a transmission branch T and a reception branch R. The transmission branch T and the reception branch R are connected by the transmission port TX and the reception port RX, respectively, and are coupled to one another and to the antenna A at the common port CP. The transmission branch T comprises a transmission filter TF, a transmission phase shift network TP and a transmission matching network TM, while the reception branch R comprises a reception filter RF, a reception phase shift network RP and a reception matching network RM.

The transmission filter TF and the reception filter RF are band pass filters which pass signals in the transmission band TB and the reception band RB, respectively, and suppress signals having other frequencies. For WCDMA, the transmission band ranges from 1920 to 1980 MHz, while the reception band ranges from 2110 to 2170 MHz. The filters can be bulk acoustic wave (BAW) filters, surface acoustic wave (SAW)

filters or any other kind of filter that has a low insertion loss for the transmission band TB and a high suppression for frequencies in the reception band RB and vice-versa. The purpose of the filters TF, RF is to provide isolation between the transmission branch T and the reception branch R so that transmission signals will not enter the reception branch R.

The transmission phase shift network TP and the reception phase shift network RP can be implemented by using transmission lines having a phase shift that is proportional to the length of the transmission line or any kind of components that produce a phase shift with low insertion loss. The phase of the transmission phase shifting network TP is chosen such that incoming reception signals R1 from the common port CP to the transmission branch T are reflected by the transmission branch T in such a way that the phase of the reflected signal R2 is 180° out of phase with the incoming signal R1. Since the incoming signal R1 and the reflected reception signal R2 cancel each other out, the transmission branch T acts as an open circuit for signals having frequencies in the reception band. Similarly, the phase of the reception phase shifting network RP is chosen such that transmission signals T1 from the transmission branch T which enter the reception branch R are reflected by the reception branch R in such a way that the phase of the reflected signal T2 is 180° out of phase with the incoming transmission signal T1. Since the incoming transmission signal T1 and the reflected transmission T2 cancel each other out, the reception branch R acts as an open circuit for signals having frequencies in the transmission band TB. The transmission phase shift network TP and the reception phase shift network RP increase isolation which is already provided by the transmission filter TF and the reception filter RF.

The transmission matching network TM and the reception matching network RM are series reactances, and are chosen for this embodiment to be an inductor L and a capacitor C, respectively. Using series reactances has the following advantages when the transmission branch T and the reception branch R are impedance matched to the antenna A. First, series reactances have predominantly constant phase shifts over frequencies so that the phase shift introduced by the matching networks TM, RM can easily be incorporated when designing the phase shift networks TP, RP. Second, series reactances can be used to match the reactive impedance of the transmission branch T and of the reception branch R to the reactive impedance of the antenna A. If the components of the transmission branch T and the reception branch R are designed to be resistive only and the antenna A shows a predominantly reactance-only impedance variation over frequency, then the reactive part of the impedance of the antenna A can be cancelled in a simple manner by the series reactances.

Figure 2:
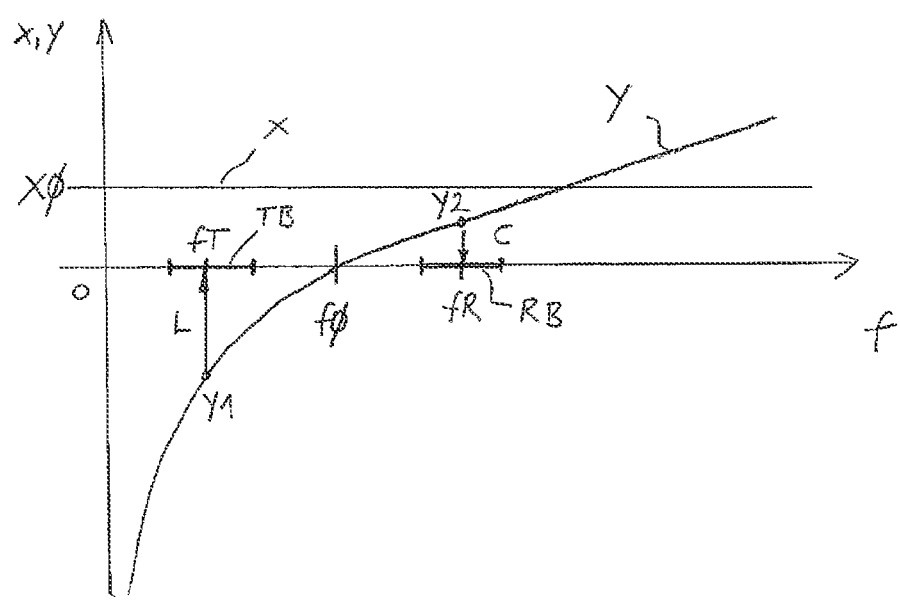
FIG. 2 shows the impedance variation of an embodiment of an antenna over frequency.

FIG. 2 shows the real, resistive part X and the imaginary, reactive part Y of the impedance Z=X+jY of an embodiment of an antenna A that has a predominantly reactance-only impedance variation over frequency f. Such an antenna can, for example, be a series resonant antenna, which can, for example, be a mobile phone antenna with a shorting pin where a slot is implemented between the feed and the shorting pins. It has a resistive part XO that is approximately constant over frequency f and whose reactance Y can be simulated by a series connection of a capacitor and an inductor. XO can, for example, be 50 Ω. The reactance of the antenna A at resonance frequency f0 is Y=0. Above the resonance frequency f0, the reactance Y is positive and below the resonance frequency f0, Y is negative. For duplexers, the resonance frequency f0 can be chosen to lie between the transmission band TB and the reception band RB, as shown. For WCDMA, the resonance frequency f0 can be chosen to be in the middle between the bands to be f0=2045 MHz.

For frequencies fT in the transmission band TB, the reactance of the antenna is Y1<0. For impedance matching of the transmission branch T to the antenna A, it is desired to have a reactance Y=0 for frequencies in the transmission band TB. The negative reactance Y1 of the antenna A can be reduced by adding an inductor L in series as is shown in FIG. 1 by the transmission matching network TM. Given that there are no other reactances in the transmission branch T, L could be chosen to be $L=Y1/(2\pi*fT)$ to achieve this. Similarly, for frequencies fR in the reception band RB, the antenna shows a positive reactance Y2. For impedance matching, a reactance Y=0 can be achieved by placing a capacitance C in series, which is shown in FIG. 1 by the reception matching network RM. If there are no further reactances in the reception branch R, C can be chosen to be $C=1/(2\pi*fT*Y2)$.

The principle of the invention discussed above can also be used when the transmission band TB and the reception band RB are swapped with respect to the resonance frequency f0 of the antenna A. It can also be used when both the transmission band TB and the reception band RB lie above or below the resonance frequency f0 of the antenna A. In this case, both branches would use series capacitors C or series inductors L, respectively, in the matching networks TM, RM.

The invention has the advantage that the reactances are matched only over the small bandwidths of the transmission band TB or the reception band RB. It is not necessary to match the antenna A over the larger bandwidth of transmission band TB, the reception band RB and the frequencies lying between these two bands. Consequently, the antenna A is better matched to the duplexer D, and antennas A with higher quality factors Q can be used. Further, the design of the transmission branch T and the reception branch R can be performed independently of each other. The filters TF, RF, phase shift networks TP, RP and matching networks TM, RM can be designed modularly of each other since the series reactances of the matching networks TM, RM have constant phase shifts over frequencies.

The invention claimed is:

1. A communication system for transmitting signals having frequencies that lie within a transmission band and for receiving signals having frequencies that lie within a reception band, the communication system comprising:
    a duplexer; and
    an antenna
    wherein the duplexer comprises a transmission branch and a reception branch the transmission branch comprising a transmission filter, a transmission phase shifting network and a transmission matching network, and the reception branch comprising a reception filter, a reception phase shifting network and a reception matching network,
    wherein the transmission matching network and the reception matching network have predominately constant phase shifts over frequencies within the reception band and within the transmission band, respectively,
    wherein the antenna is coupled to the transmission matching network and to the reception matching network and shows a predominantly reactance-only impedance variation over frequencies in the transmission band and over frequencies in the reception band, wherein the antenna has a negative reactance at frequencies in the transmission band and has a positive reactance at frequencies in the reception band, and
    wherein the transmission matching network comprises one of a series inductor and series capacitor and the reception matching network comprises the other of the series inductor and series capacitor, and wherein: in the transmission matching network comprising the series inductor a reactance of the inductor is selected to cancel the negative reactance of the antenna at frequencies in the transmission band; in the reception matching network comprising the series capacitor a reactance of the capacitor is selected to cancel the positive reactance of the antenna at frequencies in the reception band; in the transmission matching network comprising the series capacitor a reactance of the capacitor is selected to cancel the negative reactance of the antenna at frequencies in the transmission band; and in the reception matching network comprising the series inductor a reactance of the inductor is selected to cancel the positive reactance of the antenna at frequencies in the reception band.

2. The communication system according to claim 1, wherein the transmission matching network comprises a series inductor, wherein a reactance of the inductor cancels a reactance of the antenna at frequencies in the transmission band, and wherein the reception matching network comprises a series capacitor, wherein a reactance of the capacitor cancels a reactance of the antenna at frequencies in the reception band.

3. The communication system according to claim 1, wherein the transmission matching network comprises a series capacitor, wherein a reactance of the capacitor cancels a reactance of the antenna at frequencies in the transmission band, and wherein the reception matching network comprises a series inductor, wherein a reactance of the inductor cancels a reactance of the antenna at frequencies in the reception band.

4. The communication system according to claim 1, wherein the transmission band and the reception band are separated in frequency from each other by more than twice the bandwidth of the transmission band or the bandwidth of the reception band.

5. The communication system according to claim 1, wherein the antenna has a quality factor greater than 20.

6. The communication system according to claim 1, wherein the transmission filter passes frequencies within the transmission band and blocks frequencies within the reception band wherein the reception filter passes frequencies within the reception band and blocks frequencies within the transmission band, and the transmission filter and/or the reception filter comprises a bulk acoustic wave filter or a surface acoustic wave filter.

7. A method comprising:
transmitting signals having frequencies within a transmission band using a common antenna; and
receiving signals having frequencies within a reception band by using the common antenna,
wherein the common antenna shows a predominantly reactance-only impedance variation over frequencies within the transmission band and within the reception band, wherein the antenna has a negative reactance at frequencies in the transmission band and has a positive reactance at frequencies in the reception band, and wherein a transmission branch and a reception branch are impedance matched to the antenna using a transmission matching network and a reception matching network, respectively, which have phase shifts that are predominantly constant over frequencies within the reception band (RB) and within the transmission band (TB), respectively; and
wherein the transmission matching network comprises one of a series inductor and series capacitor and the reception matching network comprises the other of the series inductor and series capacitor, and wherein: in the transmission matching network comprising the series inductor a reactance of the inductor is selected to cancel the negative reactance of the antenna at frequencies in the transmission band; in the reception matching network comprising the series capacitor a reactance of the capacitor is selected to cancel the positive reactance of the antenna at frequencies in the reception band; in the transmission matching network comprising the series capacitor a reactance of the capacitor is selected to cancel the negative reactance of the antenna at frequencies in the transmission band; and in the reception matching network comprising the series inductor a reactance of the inductor is selected to cancel the positive reactance of the antenna at frequencies in the reception band.

8. The method according to claim 7, wherein the transmitting and receiving occur simultaneously using different frequencies.

9. The method according to claim 8, wherein the transmitting and receiving are performed using Wideband Code Division Multiple Access.

* * * * *